United States Patent
Fabbri et al.

(10) Patent No.: US 8,015,374 B2
(45) Date of Patent: Sep. 6, 2011

(54) METHOD, SYSTEM AND COMPUTER PROGRAM FOR BACKING-UP DATA WITH CENTRALIZED CONTROL

(75) Inventors: Claudio Fabbri, Rome (IT); Claudio Ruta, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 11/558,051

(22) Filed: Nov. 9, 2006

(65) Prior Publication Data
US 2007/0159974 A1   Jul. 12, 2007

(30) Foreign Application Priority Data
Nov. 21, 2005  (EP) ..................................... 05111045

(51) Int. Cl.
*G06F 12/00* (2006.01)
(52) U.S. Cl. ................................. 711/162; 711/E12.028
(58) Field of Classification Search .................... 711/162
See application file for complete search history.

(56) References Cited

U.S. PATENT DOCUMENTS 5,717,934 A * 2/1998 Pitt et al. ........................ 713/330
7,467,267 B1 * 12/2008 Mayock ........................ 711/162

* cited by examiner

*Primary Examiner* — Reginald G Bragdon
*Assistant Examiner* — Hamdy S Ahmed
(74) *Attorney, Agent, or Firm* — Garg Law Firm, PLLC; Rakesh Garg; Jeffrey S. LaBaw

(57) ABSTRACT

A back-up solution (300) is proposed for use in a data processing system, wherein different host machines support multiple guest machines. For this purpose, a master one of the host machines owns (306) a scheduling file, which indicates which guest systems are enabled to back-up their data, and when the back-up process must be performed. Every day, each other host machine verifies (309-318) whether the corresponding guest machines are included in the scheduling file for the current day. If so, the path of the respective data to be backed-up is added (324-330) to a control file on the master host machine. At the end of the procedure, the master host machine may then back-up the required data of the different guest machines (as indicated in the control file); at the same time, any critical guest machine automatically shuts-down (342-345), so as to ensure the consistency of the corresponding backed-up data.

10 Claims, 4 Drawing Sheets

METHOD, SYSTEM AND COMPUTER PROGRAM FOR BACKING-UP DATA WITH CENTRALIZED CONTROL

FIELD OF THE INVENTION

The present invention relates to the information technology field. More specifically, the present invention relates to the back-up of data.

BACKGROUND ART

The back-up of data plays a key role in the management of modern data processing infrastructures. Generally, the process of backing-up data consists of making one or more additional copies of an original source to different devices; for safety reasons, the back-up copies are preferably stored in a location different from the one of the original data. In this way, the data is preserved in case of any failure of the infrastructure (such as a memory crash), other disasters (such as a fire), or accidental deletions of corruption; therefore, the data can be restored (i.e., recovered) whenever its original version is damaged or lost.

The back-up process is a routinely activity in large organizations (especially when critical data and/or services are managed). However, the design of a proper back-up process is a very complex task. Indeed, for this purpose a number of aspects must be carefully considered; for example, it is very import to choose the back-up media properly, to ensure the consistency of the copied data, to define an effective back-up procedure, to establish a correct recovery strategy, to verify the integrity and the validity of the back-up copies, and the like.

Additional problems arise in distributed infrastructures wherein the data to be backed-up is stored on multiple computers. Particularly, in this context it is very difficult to control the whole back-up process (because of its inherent scattering); for example, the scheduling of the back-up processes on the different computers is decidedly nontrivial. The problem is more acute in heterogeneous environments, wherein the computers implement different hardware and/or software platforms.

In should be noted that in the above-mentioned scenario it is normally untenable to have the back-up process completely enforced from a central site on the different computers; indeed, in most practical situations the definition of the data to be backed-up must always remain under local control.

Another drawback of the solutions known in the art is that they are quite invasive. Indeed, the back-up process generally requires the availability of a relatively complex agent on each computer (which agent is in charge of performing all the operations required to manage the back-up process). However, the installation of this agent on every computer of the infrastructure is not always viable; for example, this may be prevented because of security concerns.

In any case, it would be desirable to rely on as little human intervention as possible during the back-up process; indeed, any human action is scarcely repeatable, prone to errors and strongly dependent on personal skills. However, the design of an automated back-up process for infrastructures with distributed architecture is hindered by the above-mentioned problems.

SUMMARY OF THE INVENTION

The present invention provides a solution as set out in the independent claims. Advantageous embodiments of the invention are described in the dependent claims.

In principle, the invention proposes a back-up process with a centralized control.

Particularly, an aspect of the invention provides a method for backing-up data in a system including a plurality of data processing entities (such as physical and/or logical machines). The method includes a series of steps for a set of the entities (from one to all of them). At first, a scheduling structure (such as a file) is provided on a selected one of the entities; the scheduling structure includes an indication of the entities enabled to back-up corresponding data. The method continues by verifying the inclusion of each entity in the scheduling structure. In response to the inclusion, each enabled entity adds an indication of the corresponding data to a control structure (such as another file) on the selected entity. The method ends by backing-up the data indicated in the control structure under the control of the selected entity.

In a preferred embodiment of the invention, the scheduling file is also used to define a scheduling policy for each enabled entity.

Typically, the verification of the inclusion in the scheduling file is performed periodically under the control of each entity.

As a further improvement, the entities perform this step out-of-phase to each other.

A way to further improve the solution is of using the scheduling structure to set a shutdown time for critical entities.

In a specific embodiment, the invention applies to guest machines implemented on host machines (which control the execution of the above-mentioned operations for the corresponding guest machines).

Advantageously, the scheduling file, the control file and the data to be backed-up are stored on shared disks.

As a further enhancement, the proposed solution prevents the repeated back-up of the same shared disks (duplicated in the control file).

Another aspect of the invention proposes a computer program for performing this method.

A further aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
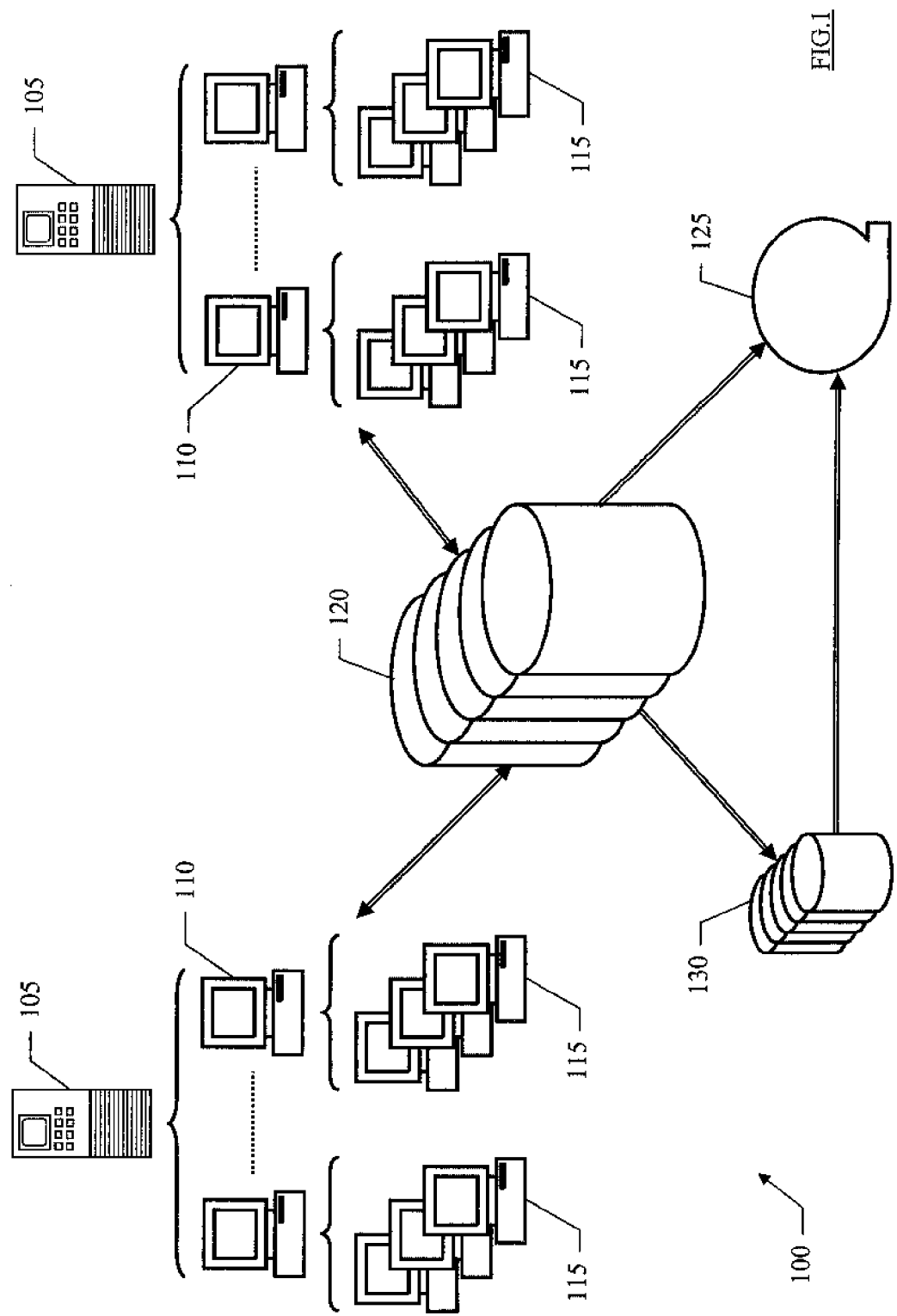
FIG. 1 is a pictorial representation of a data processing infrastructure in which the solution according to an embodiment of the invention can be implemented.

With reference in particular to FIG. 1, a data processing infrastructure 100 with distributed architecture is illustrated. The infrastructure 100 includes a plurality of physical computers 105 (such as of the "zSeries" or "AS/400" type by IBM Corporation). Each computer 105 implements multiple logical systems 110; for this purpose, the computer 105 is split into corresponding Logical Partitions (LPARs), each one consisting of a subset of the hardware resources of the computer 105 (which operates independently as a separate computer). In turn, each (host) system 110 supports multiple guest systems 115; particularly, the host system 110 provides corresponding virtual machines, each one consisting of an abstract environment giving the appearance of a real computer (which the virtual machine has sole control of).

The computers 105 physically share an array of Direct Access Storage Devices (DASDs) 120, typically consisting of magnetic disks; the shared disks 120 provide fast access to a considerably large amount of data (for example, 3 Gbytes in the disks of the 3390-3 type or 10 Gbytes in the disks of the 3390-9 type by IBM Corporation). The shared disks 120 are used to store local data of the (logical) systems 110,115; the local data is organized according to different file systems (each one depending on a software platform of the corresponding logical system 110,115). Moreover, the shared disks 120 may also store global data that can be accessed (either for reading and/or writing) by more logical systems 110,115. For this purpose, the infrastructure 100 implements a sharing file system service. The sharing service allows each logical system 110,115 to exports its file system (or a portion thereof) for other logical systems 110,115; the latter logical systems 110,115 can then mount the exported data, which is then completely integrated into their file systems. This result is achieved by means of corresponding client/server modules running on the different logical systems 110,115, which modules communicate through a corresponding protocol designed to be platform-independent (such as the TCP/IP). An example of suitable sharing service is the Network File System (NFS).

As described in detail in the following, the data on the shared disks 120 is backed-up onto removable media 125, typically consisting of magnetic tape cartridges (or streamers); the tapes 125 are very cheap and have large (sequential access) storage capacities (for example, 10 Gbytes for the tapes of the 3590 type by IBM Corporation). The back-up process may be carried out directly from the shared disks 120 to the tapes 125. Alternatively, the data to be backed-up is suitably processed and saved onto an array of repository disks 130; the processed data in the repository disks 130 is then copied to the tapes 125.

Figure 2:
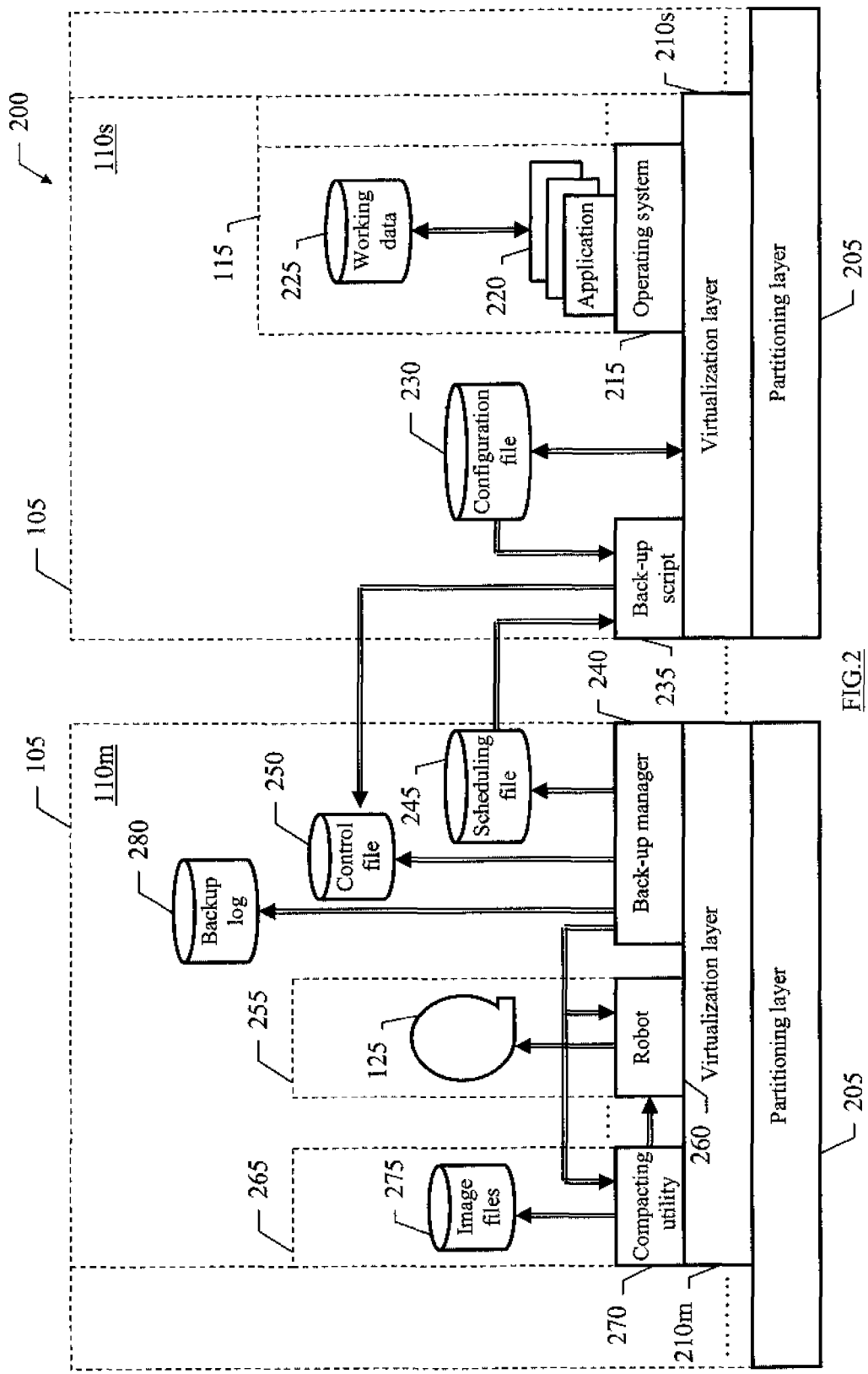
FIG. 2 shows the main software components that can be used to practice the solution according to an embodiment of the invention.

Moving to FIG. 2, the main software components that run on the above-described infrastructure are denoted as a whole with the reference 200. The information (programs and data) is typically stored on the shared disks and loaded, at least partially, into a working memory (i.e., a RAM) of each computer when the programs are running. The programs are initially installed onto the shared disks, for example, from tapes.

Particularly, a partitioning layer 205 on each computer 105 simulates the corresponding host systems by splitting the computer 105 into multiple logical partitions, each one controlling a dedicated subset of the hardware resources of the computer 105. As described in detail in the following, one of the host systems (hereinafter denoted as master system 110m) controls the back-up process for all the other host systems (hereinafter denoted as slave systems 110s). Particularly, the master system 110m schedules the back-up processes of the guest systems 115 of the different salve systems 110s into a shared file. Periodically, each slave system 110s verifies whether it must back-up its data (according to the content of this shared file); if so, the slave system 110s identifies the data to be backed-up into another shared file. At the end of the procedure, the master system 110m can then back-up the required data of the different guest systems 115.

The proposed solution allows controlling the back-up process centrally; in particular, it is possible to manage the scheduling of the back-up processes on the different guest systems 115 in a very effective way. This result is achieved independently of the file systems that are supported by the different guest systems 115; in other words, the devised back-up process is essentially platform-independent. At the same time, however, the control of the data to be backed-up remains completely local.

This technique only requires the installation of a very simple program on the different slave systems 110s, while the core module of the back-up process is required on the master system 110m only. As a result, the impact on the slave systems 110s in negligible; moreover, no additional component at all is required on the different guest systems 115. This makes the proposed solution well suited to applications having strict security requirements.

It is emphasized that the above-described back-up process does not require any human intervention (after its initial setup). As a result, the proposed solution is totally automated. This improves the quality of the results, and strongly reduces the risk of any error.

Considering now a generic slave system 110s more in detail, a virtualization layer 210s simulates the corresponding guest systems 115 by means of multiple virtual machines. Examples of commercial virtualization layers that provide this functionality are the "VMware" by IBM Corporation or the "Microsoft Virtual Server 2005 (MSVS)" by Microsoft Corporation.

In each guest system 115, an operating system 215 (such as the "zOS" by IBM Corporation or the "Linux") defines its software platform; as pointed out above, the operating system 215 works as if it was installed on a real computer (as simulated by the virtualization layer 210s). One or more software applications 220 run on top of the operating system 215. Each software application 220 owns corresponding working data 225 (such as files, databases, and the like).

Configuration information about all the guest systems 115 running on the slave system 110s is stored by the virtualization layer 210s into a corresponding file 230. Typically, the configuration file 230 indicates the hardware resources of the slave system 110s that are assigned to each guest system 115; particularly, this configuration information includes an identifier (i.e., its absolute path) of each shared disk that is used by the guest system 115 for storing its data (such as the operating system 215, the software applications 220 and the working data 225).

A back-up script 235 (running in the slave system 110s) interfaces with the master system 110m as a client of the back-up process; the back-up script 235 (for example, written in the REXX language) consists of a small program, which is formed by a series of commands generally intended to be performed without any user's interaction. For this purpose, the back-up script 235 accesses the configuration file 230 (in read-only mode).

Moving now to the master system 110m, a similar virtualization layer 210m likewise simulates multiple virtual machines. A back-up manager 240 (running in the master system 110m) implements the server side of the back-up process for all the slave systems 110s; typically, the back-up manager 240 consists of an agent continuously running in the background.

The back-up manager 240 controls a scheduling file 245 (for example, created by means of an editor). The scheduling file 240 indicates which guest systems 115 on the different slave systems 110s (specified by corresponding identifiers) is enabled to back-up its data, and when the back-up process must be performed; for this purpose, the scheduling file 240 preferably stores the frequency of the back-up process for each (enabled) guest system 115. In addition, the scheduling file 245 also allows identifying critical guest systems 115, wherein the back-up process must be performed when the guest systems 115 are off; this may be necessary to ensure that the backed-up data is always consistent (for example, when a transaction may affect different memory structures). For each critical guest system 115, the scheduling file 245 stores the time (hours and minutes) when the guest system 115 must be shutdown. For example, let us consider a situation in which a vital guest system 115 named "G1" on a slave system 110s named "H1" must be backed-up every day; on the other hand, another slave system 110s named "H2" hosts less important guest systems 115, i.e., a guest system 115 named "G2a" (which must be backed-up once a week) and a guest system 115 named "G2b" (which must be backed-up once a month). The guest system "G1" is critical, and its shutdown time is "22:00". In this case, the scheduling file 245 for a whole year may be defined by the following table:

| Host system | Guest system | Shutdown time | Back-up frequency |
|---|---|---|---|
| H1 | G1 | 22:00 | 1 day |
| H2 | G2a | | 1 week |
| | G2b | | 1 month |

The back-up script 235 on each slave system 110s reads the scheduling file 245. Whenever each guest system 115 (hosted on the slave system 110s) is indicated in the scheduling file 245 for the current day (according to the back-up frequency), the back-up script 235 extracts the identifiers of the shared disks (used by the guest system 115 for storing its data) from the configuration file 230. This information is added to a control file 250, which is owned by the master system 110m as well. In this way, at the end of the procedure the control file 250 will include a list of all the shared disks in the infrastructure to be backed-up.

The control file 250 is accessed by the back-up manager 240, which controls the back-up process accordingly. For this purpose, the back-up manager 240 exploits a pool of dedicated virtual machines 255 hosted on the master system 110m (such as 4-8). Each virtual machine 255 runs a robot 260 in a native mode; the robot 260 consists of a program (operating automatically without any human intervention), which copies the required data to the tapes 125. The back-up manager 240 can invoke a selected robot 260 directly to back-up a specific large shared disk (indicated in the control file 250). Instead, when small shared disks must be copied the back-up manager 240 also exploits a pool of further dedicated virtual machines 265 hosted on the master system 110m (such as 8-15). Each virtual machine 265 runs a compacting utility 270 in a native mode; the compacting utility 270 compresses multiple shared disks and combines them into a single image file 275 (for example, a CMS file), which is stored on the repository disks. The compacting utility 270 in turn passes the image file 275 to a selected robot 260 (which copies it to the tapes 125). At the end, the back-up manager 240 saves the result of the back-up process into a corresponding back-up log 280.

Figure 3A:
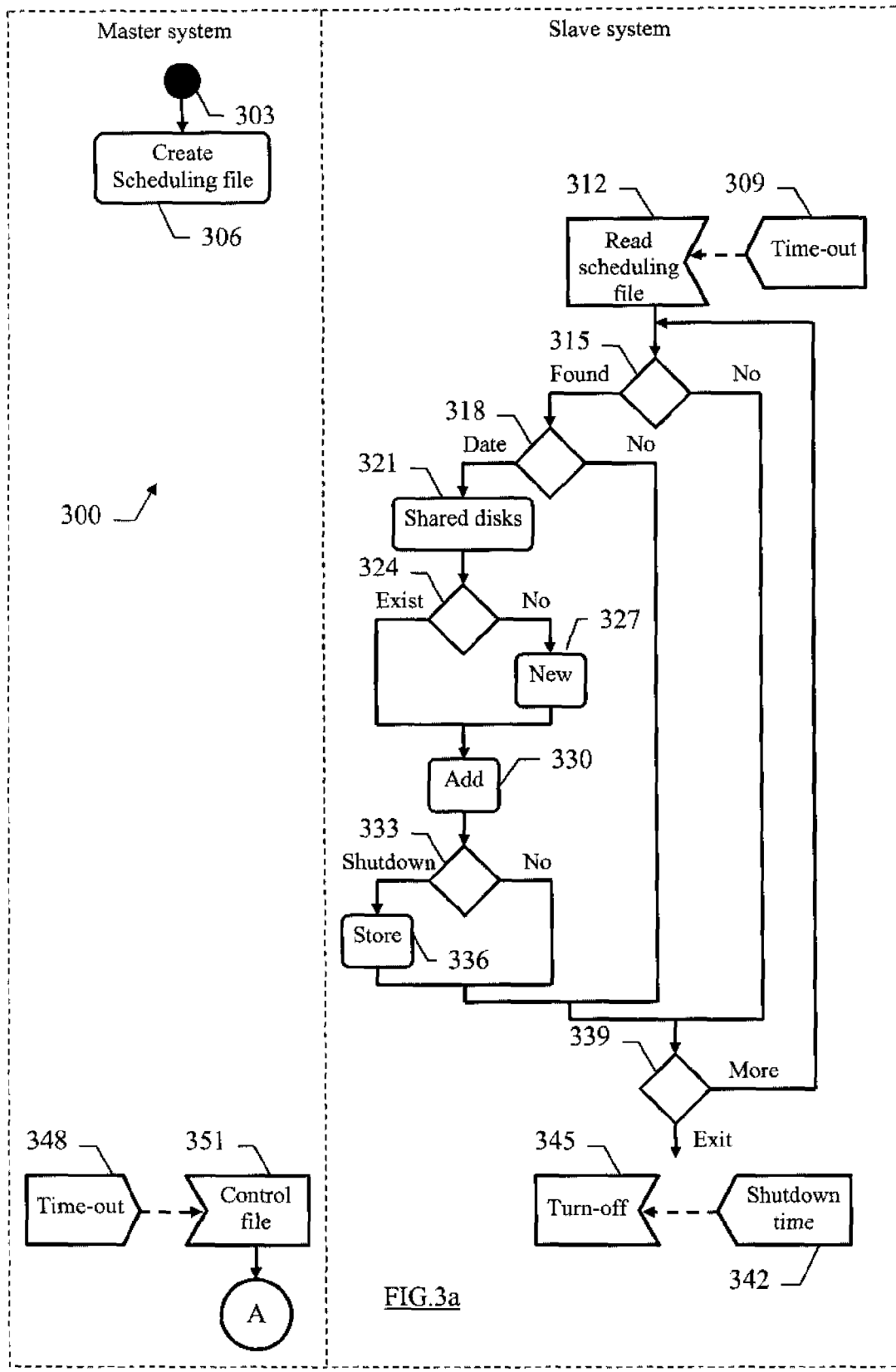
FIGS. 3a-3b illustrate a diagram describing the flow of activities relating to an implementation of the solution according to an embodiment of the invention.
Figure 3B:
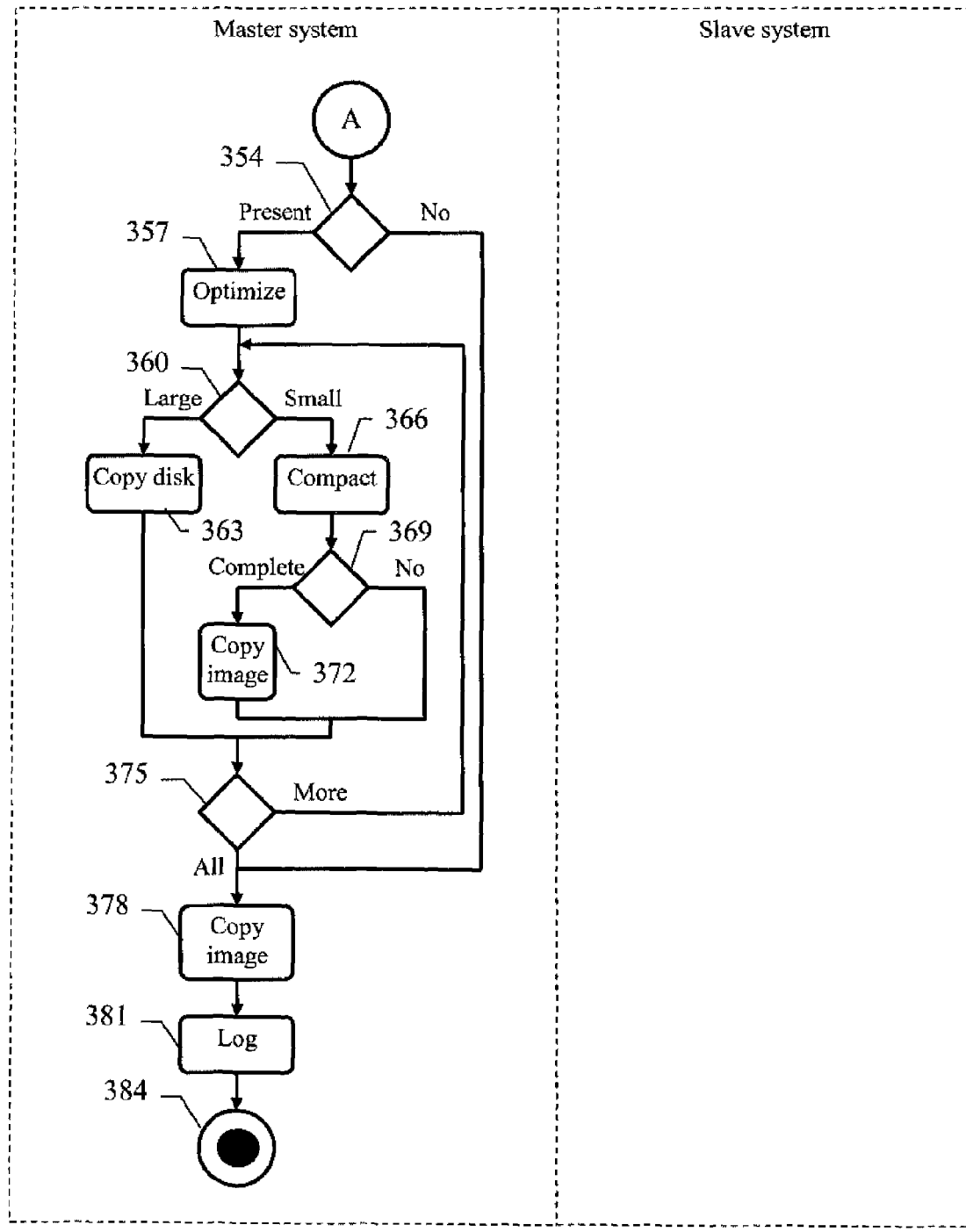

With reference now to FIGS. 3a-3b, the logic flow of an exemplary method that can be implemented in the above-described system (to manage the back-up process) is represented with a method 300.

The method begins at the black start circle 303 in the swim-lane of the master system. Continuing to block 306, an administrator of the whole infrastructure (in charge of the back-up process) defines a new scheduling file; for example, this operation is performed at the end of each year for the whole next year.

Moving now to the swim-lane of a generic slave system, a verification procedure is performed periodically (for example, every day); preferably, this verification procedure is invoked out-of-phase on the different slave systems (such as at 12:00 on a first one, at 12:15 on a second one, at 12:30 on a third one, and so on). This choice prevents any contention on the required shared resources (i.e., the scheduling file and the control file).

More in detail, whenever a corresponding time-out expires (block 309) the back-up script is launched at block 312; this triggers the reading of the scheduling file from the master system, followed by the execution of a loop for each guest system that is hosted on the slave system. The loop begins at block 315, wherein the back-up script verifies whether a current guest system (starting from the first one) is included in the scheduling file. If so, a further test is performed at block 318 to determine whether the current day matches the back-up frequency that is specified in the scheduling file for the guest system.

In the affirmative case (meaning that the guest system is enabled to back-up its data today), the method descends into block 321; in this phase, the back-up script extracts (from the configuration file) the identifiers of the shared disks that are used by the guest system. A test is now made at block 324 to determine whether the control file for today already exists on the master system (for example, identified by a keyword followed by the current date). If not, a new control file is created at block 327, and the flow of activity then continues to block 330; conversely, the same point is reached from block 324 directly. In any case, the identifiers of the shared disks (wherein the data of the guest system to be backed-up is stored) are added to the control file at block 330.

Considering now block 333, if a shutdown time is specified in the control file for the (critical) guest system the method descends into block 336; in this phase, the shutdown time for the guest system is stored onto the slave system (for example, in the corresponding record within the configuration file).

The flow of activity joints again at block 339; this point is reached from block 336, from block 333 (when no shutdown time is specified in the scheduling file for the guest system), from block 318 (when the current day is not specified in the scheduling file for the guest system), or from block 315 (when the guest system is not included in the scheduling file). If further guest systems are still to be processed, the method returns to block 315 to repeat the same operations on a next guest system; conversely, the loop is exit thereby terminating the periodic verification procedure.

In this way, at the end of the verification procedure on all the slave systems, the control file will include the complete list of the shared disks to be backed-up today (for the enabled guest systems on the different slave systems).

The flow of activity continues in the swim-lane of every slave system; for each critical guest system hosted thereon, as soon as the corresponding shutdown time is reached (block 342) the critical guest system is turned off at block 345.

At the same, the expiration of a corresponding time-out at block 348 triggers the back-up manager on the master system to enter block 351; in this phase, the back-up manager looks for the control file of today (identified according to the above-mentioned naming convention). If the control file exists (decision block 354), the method continues to block 357 wherein any duplicated shared disks in the control file are deleted. This prevents the repetition of the copy of the same share disks; in this way, the back-up process is optimized so as to reduce the required operations (and then its length).

A loop is now performed for each remaining shared disk to be backed-up (starting from the first one). The loop begins at block 360, wherein the flow of activity branches according to the capacity of a current shared disk. When the shared disk is large (i.e., substantially with the same capacity of the tapes) the block 363 is executed, whereas when the shared disk is smaller the blocks 366-372 are executed; in both cases, the method joints at block 375.

Considering in particular block 363 (large shared disks, such as with a capacity of 10 Gbytes in the example at issues), the back-up manager selects one of the available robots (for example, according to a load-balancing algorithm); the selected robot is instructed to copy the shared disk to a tape (one shared disk on one tape), with a technique known as Direct to Disk Recording (DDR). The method then continues to block 375.

With reference instead to block 366 (small shared disks, such as with a capacity of 3 Gbytes in the example at issues), the back-up manager selects one of the available compacting utilities (always according to a load-balancing algorithm); the selected compacting utility is then instructed to compress the shared disk and add it to a current image file (on the repository disks), with a different technique known as DDR2CMSX. A test is now performed at block 369 to verify whether the image file is complete; in the example at issue, wherein each tape has a capacity of 10 Gbytes and each small shared disk has a capacity of 3 Gbytes, this occurs after 3 small shared disks have been compressed into the image file. If the result of the test is positive, the back-up manager at block 372 likewise selects one of the available robots and now instructs it to copy the image file to a tape (three shared disks on one tape), for example, by using the VM command VMFPLC2. The method then continues to block 375; the same point is also reached from block 369 directly when the image file is not complete.

Considering now block 375, a test is made to verify whether further shared disks remain to be backed-up (in the control file). If so, the method returns to block 360 to reiterate the procedure on a next shared disk; conversely, the loop is exit descending into block 378.

In this phase, any image file remained incomplete (under the control of the different compacting utilities) is likewise copied to a corresponding tape. Proceeding to block 381, a result of the back-up process is saved into the corresponding log; at the same time, the administrator is preferably notified of the completion of the back-up process by e-mail (with its result attached thereto). The method ends at the concentric white/black stop circles 384.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the infrastructure has a different architecture or includes equivalent units. Moreover, each computer may have another structure or may include similar elements (such as cache memories temporarily storing the programs or parts thereof to reduce the accesses to the shared disks during execution); in any case, it is possible to replace the computer with any code execution entity (such as a PDA, a mobile phone, and the like). Alternatively, the proposed solution may be applied to a subset only of the host/guest systems available in the infrastructure. The concepts of the present invention also apply to any other data to be backed-up (for example, data as such, program code, multimedia works, and the like). In a different embodiment of the invention, the scheduling file may also include an indication of the data to be backed-up for each guest system (however, with the corresponding access paths that are always added to the control file by the respective slave systems).

It should be readily apparent that the proposed scheduling file and control file are merely illustrative, and they may be replaced with any other equivalent structures (for example, by simply enumerating the back-up dates).

Nothing prevents the definition of more complex policies in the scheduling file (such as conditioned on specific events); in any case, a basic implementation of the invention wherein it is only possible to specify the guest systems to be backed-up (every time the back-up process is carried out) is within the scope of the present invention.

Even though in the preceding description reference has been made to a back-up process wherein the verification of the inclusion of each guest system in the scheduling file is performed every day (by the corresponding slave machine), this is not to be intended in a limitative manner. Indeed, similar considerations apply if the same operation is performed with any other periodicity, or even with more complex time patterns; in any case, an implementation wherein the guest systems are polled by the master system is not excluded.

Similar considerations apply when the time shifting (between each pair of consecutive verification procedures performed by different slave systems) has another length; alternatively, the same result may also be achieved with a notification technique (wherein each slave system informs the next one of the completion of its verification procedure). However, nothing prevents a basic implementation wherein all the slave systems perform the verification procedure at the same time.

Without departing from the principles of the invention, the shutdown times of the critical guest systems may be defined in any other way. For example, in a different embodiment of the invention, no shutdown time is specified in the scheduling file; in this case, every day just before the starting of the back-up process (such as at 22:00) each slave system reads the scheduling file on the master system, and unconditionally turns off all the corresponding guest systems that are included therein. Moreover, in the proposed implementation the restart of the guest systems being turned off is left to their owners; alternatively, it is also possible to implement an automatic procedure wherein the back-up manager notifies the slave systems of the completion of the back-up process, so as to allow them to restart their critical guest systems automatically. In any case, it is emphasized that the feature relating to the shutdown of the guest systems is not strictly necessary and it may be omitted in some implementations (for example, when the consistency of the data is not vital).

Although the solution according to the present invention has been specifically designed for an environment based on virtual machines, this is not to be interpreted in a limitative manner. Indeed, the same concepts also apply to systems with equivalent architecture (wherein generic host machines implement multiple guest machines); in any case, the application of the proposed solution to any other data processing entities (such as physical machines each one controlling the execution of the required operations directly) is contemplated.

The devised solution is preferably implemented in the above-described infrastructure based on shared disks (or any other storage media). However, the same solution may also find application in network infrastructures.

Moreover, the result of preventing the repeated back-up of the same shared disks (duplicated in the control file) may be achieved with equivalent techniques (for example, by skipping them during the back-up process). In any case, a simplified embodiment without this feature is within the scope of the invention.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for backing-up data in a system including a plurality of host data processing systems, for a set of the data processing systems the method comprising:

providing a scheduling structure on a selected one of the host data processing systems, the scheduling structure including an indication of guest data processing systems executing on a second host data processing system enabled to back-up corresponding data;

verifying inclusion of each enabled guest data processing system executing under the second host data processing system in the scheduling structure;

in response to the inclusion of each enabled guest data processing system in the scheduling structure, receiving from the second host data processing system an indication of data corresponding to each enabled data processing system for adding to a control structure on the selected one of the host data processing systems; and backing-up the data corresponding to each enabled data processing system executing under the second host data processing system indicated in the control structure under control of the selected one of the host data processing systems.

2. The method according to claim 1, wherein the scheduling structure further includes an indication of a scheduling policy for each enabled guest data processing system, the step of verifying the inclusion of each data processing system in the scheduling structure including:

verifying a matching of a current date with a corresponding scheduling policy.

3. The method according to claim 1, wherein the step of verifying the inclusion of each enabled guest data processing system in the scheduling structure is performed periodically under control of the second host data processing system.

4. The method according to claim 3, wherein the second host data processing system performs the step of verifying the inclusion of each enabled guest data processing system executing on the second host data processing system in the scheduling structure out-of-phase with other host data processing systems.

5. The method according to claim 1, wherein an indication of a shutdown time is present in the scheduling structure for at least a critical one of the enabled guest data processing systems, the method further including steps of:

in response to the inclusion of each enabled guest data processing system in the scheduling structure, the second host data processing system verifying a presence of a corresponding shutdown time in the scheduling structure; and in response to the presence of the corresponding shutdown time in the scheduling structure, each critical enabled guest data processing system shutting down at a reaching of the corresponding shutdown time.

6. The method according to claim 1, wherein the system includes a plurality of host machines each one hosting a plurality of guest machines, the data processing systems consisting of the guest machines, and wherein the step of verifying the inclusion of each enabled guest data processing system in the scheduling structure and the step of adding the indication of the corresponding data to the control structure on the selected one of the host data processing systems are performed under control of each host machine for a corresponding guest machine.

7. The method according to claim 1, wherein the data processing systems share a plurality of storage media, the scheduling structure, the control structure, and the corresponding data being stored on a shared storage media.

8. The method according to claim 7, wherein the control structure includes an indication of the shared storage media wherein the corresponding data of each enabled guest data processing system is stored, the method further including a step of:

preventing repeated back-up of each shared storage media being repeated in the control structure.

9. A computer usable program product comprising a computer-usable storage medium including computer usable code for backing-up data in a system, the computer usable code comprising:

computer usable code for providing a scheduling structure on a selected one of a plurality of host data processing systems, the scheduling structure including an indication of guest data processing systems executing on a second host data processing system enabled to back-up corresponding data;

computer usable code for verifying inclusion of each enabled guest data processing system executing under the second host data processing system in the scheduling structure;

computer usable code for receiving from the second host data processing system, in response to the inclusion of each enabled guest data processing system in the scheduling structure, an indication of data corresponding to each enabled data processing system for adding to a control structure on the selected one of the host data processing systems; and computer usable code for backing-up the data corresponding to each enabled data processing system executing under the second host data processing system indicated in the control structure under control of the selected one of the host data processing systems.

10. A system including a plurality of data processing systems, for a set of the data processing systems the system including:
- a storage device including a storage medium, wherein the storage device stores computer usable program code; and
- a processor, wherein the processor executes the computer usable program code, and wherein the computer usable program code comprises:
- computer usable code for providing a scheduling structure on a selected one of a plurality of host data processing systems, the scheduling structure including an indication of guest data processing systems executing on a second host data processing system enabled to back-up corresponding data;
- computer usable code for verifying inclusion of each guest data processing system executing under the second host data processing system in the scheduling structure;
- computer usable code responsive to the inclusion of each enabled guest data processing system in the scheduling structure for receiving from the second host data processing system an indication of data corresponding to each enabled data processing system for adding to a control structure on the selected one of the host data processing systems; and
- computer usable code for backing-up the data corresponding to each enabled data processing system executing under the second host data processing system indicated in the control structure under control of the selected one of the host data processing systems.

* * * * *